United States Patent
Pak et al.

(10) Patent No.: US 8,474,084 B2
(45) Date of Patent: Jul. 2, 2013

(54) SYSTEM FOR CLEANING SURFACE OF SOLAR CELL PANEL

(75) Inventors: Hunkyun Pak, Daejeon (KR);
Yong-Seok Jun, Daejeon (KR);
Ho-Gyeong Yun, Seoul (KR);
Jong-Hyeok Park, Daejeon (KR);
Seung-Yup Lee, Gyeongsangbuk-do (KR); Man-Gu Kang, Daejeon (KR);
Jong-Dae Kim, Daejeon (KR);
Soo-Young Oh, Daejoen (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 588 days.

(21) Appl. No.: 12/680,876

(22) PCT Filed: May 9, 2008

(86) PCT No.: PCT/KR2008/002631
§ 371 (c)(1),
(2), (4) Date: Mar. 30, 2010

(87) PCT Pub. No.: WO2009/044982
PCT Pub. Date: Apr. 9, 2009

(65) Prior Publication Data
US 2010/0212093 A1  Aug. 26, 2010

(30) Foreign Application Priority Data
Oct. 1, 2007  (KR) .......... 10-2007-0098827

(51) Int. Cl.
*A47L 11/00*  (2006.01)

(52) U.S. Cl.
USPC .......... 15/21.1; 134/56 R; 134/57 R

(58) Field of Classification Search
USPC .......... 15/21.1; 134/56 R, 57 R
See application file for complete search history.

(56) References Cited

U.S. PATENT DOCUMENTS

| | | | |
|---|---|---|---|
| 6,121,738 A | 9/2000 | Meier et al. | |
| 6,911,593 B2 | 6/2005 | Mazumder et al. | |
| 2003/0034062 A1 | 2/2003 | Stern et al. | |
| 2006/0130259 A1 | 6/2006 | Collins | |
| 2006/0143845 A1 | 7/2006 | Miyake et al. | |
| 2007/0240278 A1* | 10/2007 | MacDonald | 15/405 |
| 2009/0266353 A1* | 10/2009 | Lee | 126/593 |
| 2011/0073143 A1* | 3/2011 | Levy et al. | 134/56 R |

FOREIGN PATENT DOCUMENTS

| | | |
|---|---|---|
| JP | 59-150484 A | 8/1984 |
| JP | 60-156224 A | 8/1985 |
| JP | 3192775 A | 8/1991 |
| JP | 5-38919 U | 5/1993 |
| JP | 7038131 A | 2/1995 |

(Continued)

*Primary Examiner* — Lee D Wilson
*Assistant Examiner* — Shantese McDonald
(74) *Attorney, Agent, or Firm* — Rabin & Berdo, P.C.

(57) ABSTRACT

There is provided a system for cleaning a surface of a solar cell panel. The system includes a measurement unit measuring a power generation value of a solar cell panel, a reference unit providing a reference value, a control unit comparing the power generation value measured at the measurement unit with the reference value provided from the reference unit to command cleaning of the solar cell panel, a driving unit operating a cleaning apparatus for cleaning a surface of the solar cell panel. The control unit commands cleaning of the solar cell panel only when the power generation value decreases because of a contamination of the surface of the solar cell panel.

9 Claims, 2 Drawing Sheets

FOREIGN PATENT DOCUMENTS

| | | |
|---|---|---|
| JP | 10-326902 | 12/1998 |
| JP | 11-350684 | 12/1999 |
| JP | 2003-197945 | 7/2003 |
| JP | 2004-186632 A | 7/2004 |
| JP | 2008-21683 | 1/2008 |
| KR | 20-2007-0000926 | 8/2007 |

* cited by examiner

SYSTEM FOR CLEANING SURFACE OF SOLAR CELL PANEL

TECHNICAL FIELD

The present invention disclosed herein relates to a solar photovoltaic power generation system, and more particularly, to a system for cleaning a surface of a solar cell panel.

The present invention has been derived from research undertaken as a part of IT R & D program of the Ministry of Information and Communication and Institution of Information Technology Association (MIC/IITA) [2006-S-006-02], Components/Module technology for ubiquitous terminals.

BACKGROUND ART

The power generation efficiency of a solar cell is greatly affected by light interception due to foreign substances such as dust accumulated on a surface of the solar cell. Since such foreign substances decrease the power generation efficiency of the solar cell, it is preferable to remove them whenever they are accumulated on the surface of the solar cell. However, in the case of a large-scale solar photovoltaic power generation system, it is not efficient to clean surfaces of all solar cell panels at the same time such that they are always maintained in a clean state. This is because a cleaning apparatus for cleaning the surfaces of the solar cell panels is mechanically worn away and a great amount of energy is used up for a cleaning operation. Particularly, the degradation of the cleaning apparatus and the energy loss may become more serious in an area with great changes in a generation amount of dust depending on weather, for example, a desert area, an area affected by Asian dust, or the like.

DISCLOSURE OF INVENTION

Technical Problem

The present invention provides a system for cleaning a surface of a solar cell panel that can effectively clean the surface of the solar cell panel to improve the power generation efficiency of the solar cell panel and the driving efficiency of a cleaning apparatus.

Technical Solution

Embodiments of the present invention provide systems for cleaning a surface of a solar cell panel including: a measurement unit measuring a power generation value of a solar cell panel; a reference unit providing a reference value; a control unit comparing the power generation value measured at the measurement unit with the reference value provided from the reference unit to command cleaning of the solar cell panel; and a driving unit operating a cleaning apparatus for cleaning a surface of the solar cell panel. The control unit commands the cleaning of the solar cell panel only when the power generation value decreases for a reason of a contamination of the surface of the solar cell panel.

In some embodiments, the measurement unit includes at least one selected from an ammeter, a voltmeter, a wattmeter, and a watt-hour meter for measuring the power generation value of the solar cell panel.

In other embodiments, the reference unit includes a reference solar cell with a clean surface.

In still other embodiments, the reference unit includes a sunlight measuring apparatus where an error range of a power generation value caused by a surface cleanness is controlled within 10%.

In even other embodiments, the reference unit further includes at least one selected from a sun altimeter providing data about a sun altitude depending on date, time, latitude and longitude, an anemoscope/anemometer providing data about a wind direction and a wind velocity, a dust meter providing data about a dust concentration in atmosphere, a nephometer providing data about a cloud amount, and a rainfall meter providing data about a rainfall.

In yet other embodiments, the system further includes a management unit receiving a warning signal from the control unit when a decrease in the power generation value is caused by other reasons than a reason of the contamination of the surface of the solar cell panel.

In further embodiments, the control unit compares power generation values of the solar cell panel before/after an operation of the cleaning apparatus to determine whether to command an additional operation of the cleaning apparatus or transfer the warning signal to the management unit.

In still further embodiments, the cleaning apparatus uses at least one mechanical power selected from reciprocation, rotation, and translation of a wiper or/and a brush.

In even further embodiments, the cleaning apparatus uses static attraction or repulsive power.

In other embodiments of the present invention, methods of driving systems for cleaning a surface of a solar cell panel include: measuring a power generation value of a solar cell panel; comparing the measured power generation value and a reference value; operating a driving unit when a difference between the power generation value and the reference value is deviated from an error range; and cleaning a surface of the solar cell panel with a cleaning apparatus by the operation of the driving unit. The cleaning apparatus is operated only when the power generation value decreases because of a contamination of the surface of the solar cell panel.

In some embodiments, the measuring of the power generation value includes using at least one selected from an ammeter, a voltmeter, a wattmeter, and a watt-hour meter.

In other embodiments, the reference value is measured by a reference solar cell with a clean surface.

In still other embodiments, the reference value is measured by a sunlight measuring apparatus where an error range of the power generation value caused by a surface cleanness is controlled within 10%. The reference value is estimated by using at least one selected from data about a sun altitude depending on date, time, latitude, and longitude provided from a sun altimeter, data about a wind direction and a wind velocity provided from an anemoscope/anemometer, data about a dust concentration in atmosphere provided from a dust meter, data about a cloud amount provided from a nephometer, and data about a rainfall provided from a rainfall meter.

In even other embodiments, the methods further include comparing power generation values of the solar cell panel before/after of an operation of the cleaning apparatus and additionally operating the driving unit when the power generation value of the solar cell panel before/after the operation of the cleaning apparatus is less than an expected value.

In yet other embodiments, the methods further includes comparing power generation values of the solar cell panel before/after of the additional operation of the cleaning apparatus and transferring a warning signal when the power generation value of the solar cell panel before/after the additional operation of the cleaning apparatus is less than the expected value.

Advantageous Effects

According to an embodiment of the present invention, the power generation efficiency of a solar cell panel can be improved by effectively cleaning a surface of the solar cell panel. Also, the driving efficiency of a cleaning apparatus can be improved. Therefore, the power generation efficiency of a large-scale solar photovoltaic power generation system can be improved and the degradation of the cleaning apparatus and the energy loss can be minimized, thereby managing a solar photovoltaic power generation system more efficiently. Particularly, the solar photovoltaic power generation system can be effectively managed in an area with great changes in a generation amount of dust depending on weather, for example, a desert area, an area affected by Asian dust, or the like.

BRIEF DESCRIPTION OF THE DRAWINGS

The accompanying figures are included to provide a further understanding of the present invention, and are incorporated in and constitute a part of this specification. The drawings illustrate exemplary embodiments of the present invention and, together with the description, serve to explain principles of the present invention. In the figures.

MODE FOR THE INVENTION

Figure 1:
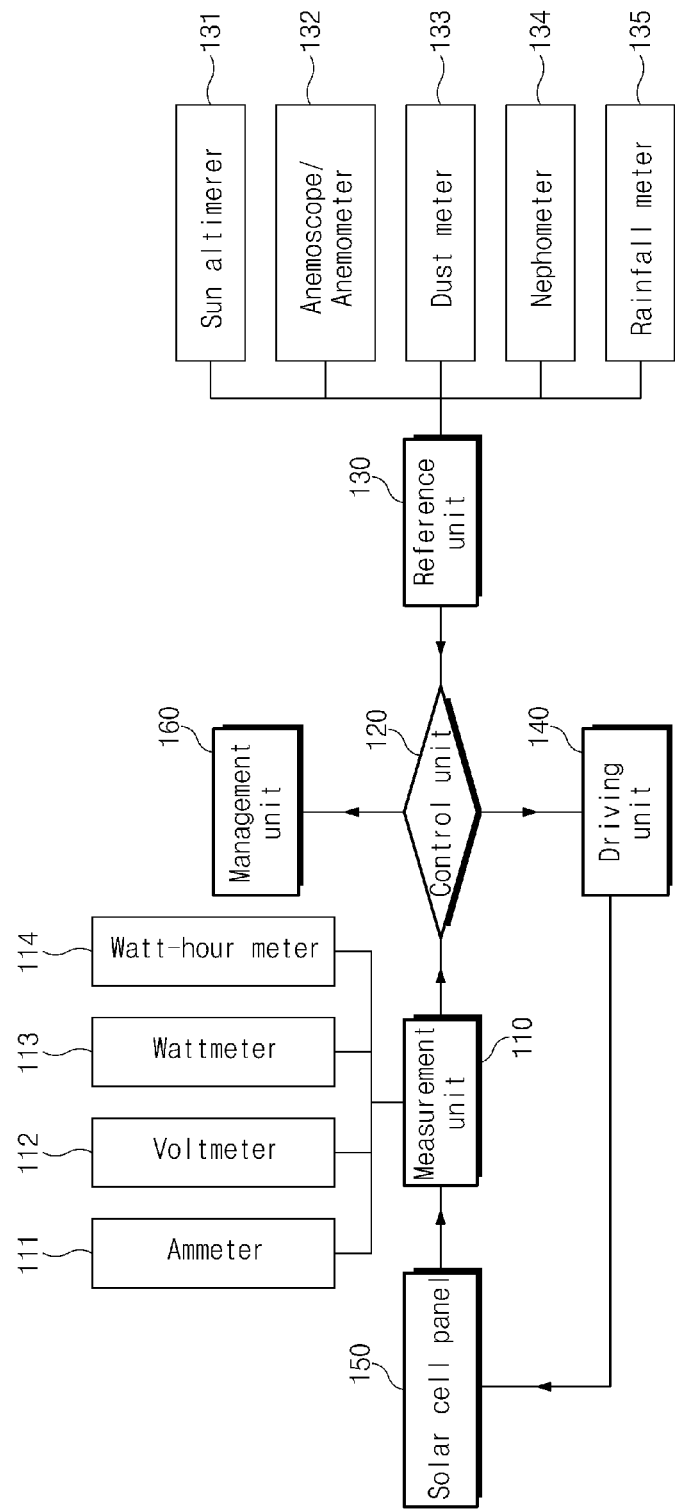
FIG. 1 is a schematic view of a system for cleaning a surface of a solar cell panel according to an embodiment of the present invention.

Preferred embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Also, reference numerals illustrated in the order of description is not limited to the order. In the figures, the dimensions of layers and regions are exaggerated for clarity of illustration. Like reference numerals refer to like elements throughout.

FIG. 1 is a schematic view of a system for cleaning a surface of a solar cell panel according to an embodiment of the present invention.

Referring to FIG. 1, a system for cleaning a surface of a solar cell panel may include a measurement unit 110, a reference unit 130, a control unit 120, a driving unit 140, a solar cell panel 150, and a management unit 160.

The solar cell panel 150 may convert sunlight incident onto a surface thereof into electrical energy. The solar cell panel 150 may be provided in plural and connected to the measurement unit 110 and the driving unit 140 of the system for cleaning the surface of the solar cell panel.

The measurement unit 110 may measure a power generation value of the solar cell panel 150. The measurement unit 110 may include at least one selected from an ammeter 111, a voltmeter 112, a wattmeter 113, and a watt-hour meter 114 to measure the power generation value of the solar cell panel 150. Preferably, the measurement unit 110 may include the ammeter 111 for measuring a photocurrent value created by light incident on the solar cell panel 150.

The reference unit 130 may provide a reference value. The reference unit 130 may include a reference solar cell with a clean surface or an apparatus of measuring an intensity of sunlight (hereinafter, referred to as a sunlight measuring apparatus) where an error range of the power generation value caused by a surface cleanness is controlled within 10%. The reference unit 130 may be configured in various forms. When the system for cleaning the surface of the solar cell panel is applied to a manned power generation system, at least one reference solar cell in an area where the manned power generation system is installed may be used as the reference unit 130. In this case, a surface of the reference solar cell used as the reference unit 130 may be maintained in a clean state without foreign substances by a person. When the system for cleaning the surface of the solar cell panel is applied to an unmanned power generation system, the sunlight measuring apparatus in an area where the unmanned power generation system is installed may be used as the reference unit 130. In the unmanned power generation system, a surface of the reference solar cell cannot be maintained in a clean state without foreign substances. Therefore, an expected value of the power generation value estimated from the intensity of sunlight measured by the sunlight measuring apparatus may be used as the reference value of the reference unit 130.

When the sunlight measuring apparatus is used as the reference unit 130, in order to provide an expected value of the power generation value estimated from the sunlight measuring apparatus more precisely, the reference unit 130 may further include a sun altimeter 131, an anemoscope/anemometer 132, a dust meter 133, a nephometer 134, and a rainfall meter 135. The system for cleaning the surface of the solar cell panel, which has the reference unit 130 including various meters, may be useful especially to a solar photovoltaic power generation system constructed in a desert area where it is windy and little cloudy.

The sun altimeter 131 may provide the reference unit 130 with data about a sun altitude depending on an operating time point (i.e., date and time) and an operating position (i.e., latitude and longitude) of the system for cleaning the surface of the solar cell panel. The anemoscope/anemometer 132 may provide the reference unit 130 with data about a wind direction and a wind velocity depending on an operating position of the system for cleaning the surface of the solar cell panel. The dust meter 133 may provide the reference unit 130 with data about a dust concentration in atmosphere depending on an operating position of the system for cleaning the surface of the solar cell panel. The nephometer 134 may provide the reference unit 130 with data about a cloud amount depending on an operating position of the system for cleaning the surface of the solar cell panel. The rainfall meter 135 may provide the reference unit 130 with data about a rainfall depending on an operating position of the system for cleaning the surface of the solar cell panel. Since various weather conditions are applied to the sunlight measuring apparatus, the reference unit 130 may provide a more precise reference value to the control unit 120.

The control unit 120 may compare the power generation value of the solar cell panel 150 measured at the measurement unit 110 with the reference value provided from the reference unit 130 to command cleaning for the surface of the solar cell panel 150. When a difference between the power generation value and the reference value compared at the control unit 120 is deviated from the error range, the control unit 120 may command the driving unit 140 to clean the surface of the solar cell panel 150.

The driving unit 140 may operate a cleaning apparatus according to the command of cleaning the surface of the solar cell panel 150 provided from the control unit 120. Accordingly, the surface of the solar cell panel 150 may be cleaned. The cleaning apparatus may use at least one mechanical power selected from reciprocation, rotation, and translation of a wiper or/and a brush. Alternatively, the cleaning apparatus may use static attraction or repulsive power.

The system for cleaning the surface of the solar cell panel may further include the management unit 160. The management unit 160 may receive a warning signal for an error of the system for cleaning the surface of the solar cell panel from the control unit 120.

When the power generation value measured at the particular or entire solar cell panel 150 decreases, the control unit 120 may analyze data such as date and time or/and weather conditions at the decreasing point of the power generation value to determine the cause of decrease in the power generation value. For example, when it is determined that the decrease in the power generation value is caused just by change in the sun altitude or the sunset or/and change in the weather condition, the control unit 120 may not command the driving unit 140 to operate the cleaning apparatus for removing the foreign substances on the surface of the solar cell panel 150. On the other hand, when it is determined that the decrease in the power generation value is caused by excessive accumulation of the foreign substances such as sand contained in the wind on the surface of the solar cell panel 150, the control unit 120 may analyze previously input data and command the driving unit 140 to operate the cleaning apparatus for removing the foreign substances accumulated on the surface of the solar cell panel 150 with the optimized frequency and strength. Also, when the strong sand storm blows temporarily, the cleaning efficiency for the surface of the solar cell panel 150 decreases. Therefore, the control unit 120 may not command the driving unit 140 to operate the cleaning apparatus until the sand storm is weakened to a predetermined level or less. That is, the cleaning apparatus may operate only when the power generation value decreases because of the contamination of the surface of the solar cell panel 150. Accordingly, the energy loss and degradation of the cleaning apparatus due to the operation thereof can be minimized.

In addition, since the driving unit 140 is configured to operate the cleaning apparatus capable of cleaning surfaces of the solar cell panels 150 independently, only the surface with the foreign substances accumulated of the solar cell panels 150 can be selectively cleaned. Accordingly, the energy loss and degradation of the cleaning apparatus due to the operation thereof can be minimized.

The control unit 120 may compare power generation values of the solar cell panel 150 before/after an operation of the cleaning apparatus to command an additional operation of the cleaning apparatus. The additional operation may be performed when the increased power generation value does not reach an expected value even though the surface of the solar cell panel 150 is cleaned by the cleaning apparatus.

The control unit 120 may also compare power generation values of the solar cell panel 150 before/after the additional operation of the cleaning apparatus to transfer a warning signal to the management unit 160. The warning signal may be transferred when the increased power generation value does not reach an expected value even though the cleaning apparatus is additionally operated. This is because the fact that the increased power generation value does not reach the expected value is caused by other factors, not the foreign substances accumulated on the surface of the solar cell panel 150. In this case, the control unit 120 may stop the additional operation of the cleaning apparatus, and then transfer the warning signal to the management unit 160.

The system for cleaning the surface of the solar cell panel having the above-structure may increase the operation efficiency of the cleaning apparatus to improve the power generation efficiency of the solar cell panel 150. In addition, the system for cleaning the surface of the solar cell panel may minimize the degradation of the cleaning apparatus and the energy loss.

Figure 2:
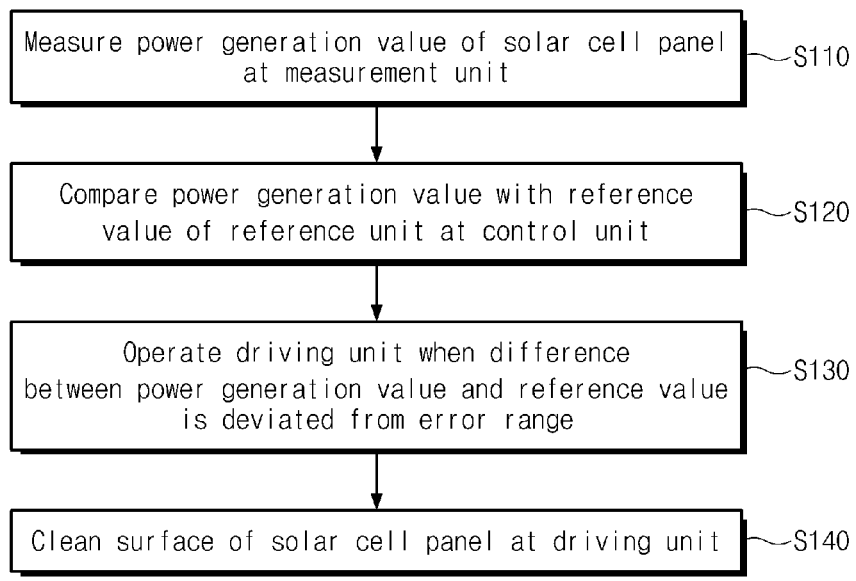
FIG. 2 is a flowchart illustrating a method of driving a system for cleaning a surface of a solar cell panel according to an embodiment of the present invention.

FIG. 2 is a flowchart illustrating a method of driving a system for cleaning a surface of a solar cell panel according to an embodiment of the present invention.

Referring to FIG. 2, according to the method of driving the system for cleaning the surface of the solar cell panel, a measurement unit measures a power generation value of a solar cell panel (S110). A control unit compares the power generation value measured at the measurement unit with a reference value provided from a reference unit (S120). When a difference between the power generation value and the reference value compared at the control unit is deviated from an error range, a driving unit is operated (S130). The driving unit operates a cleaning apparatus to clean a surface of the solar cell panel (S140).

The measuring of the power generation value of the solar cell panel at the measurement unit (S110) may be performed using at least one selected from an ammeter, a voltmeter, a wattmeter, and a watt-hour meter included in the measurement unit. Preferably, the ammeter included in the measurement unit may measure a photocurrent created by light incident on the solar cell panel. The solar cell panel may convert sunlight incident on a surface thereof into electrical energy. The solar cell panels may be provided in plural and connected to the measurement unit and the driving unit of the system for cleaning the surface of the solar cell panel.

In the comparing of the power generation value measured by the measurement unit and the reference value provided from the reference unit at the control unit (S120) and the operating of the driving unit (S130), when a difference between the power generation value and the reference value is deviated from an error range, the control unit may command the driving unit to clean the surface of the solar cell panel. Alternatively, when a difference between the power generation value and the reference value falls within the error range, the control unit may not command the driving unit to clean the surface of the solar cell panel.

The reference value provided from the reference unit may be a value measured by a reference solar cell with a clean surface or a value measured by a sunlight measuring apparatus where an error range of the power generation value caused by a surface cleanness is controlled within 10%. The reference unit may be configured in various forms. When the system for cleaning the surface of the solar cell panel is applied to a manned power generation system, at least one reference solar cell in an area where the manned power generation system is mounted may be used as the reference unit. In this case, a surface of the reference solar cell used as the reference unit may be maintained in a clean state without foreign substances by a person. When the system for cleaning the surface of the solar cell panel is applied to an unmanned power generation system, a sunlight measuring apparatus in an area where the unmanned power generation system is mounted may be used as the reference unit. In the unmanned power generation system, the surface of the reference solar cell cannot be maintained in a clean state without the foreign substances. Therefore, an expected value of a power generation value estimated from an intensity of sunlight measured by the sunlight measuring apparatus may be used as the reference value of the reference unit.

When the sunlight measuring apparatus is used as the reference unit, in order to provide an expected value of a power generation value estimated from the sunlight measuring apparatus more precisely, the reference unit may receive various data from a sun altimeter, an anemoscope/anemometer, a dust meter, a nephometer, and a rainfall meter. The system for cleaning the surface of the solar cell panel with the reference unit including these various meters may be useful especially to a solar photovoltaic power generation system constructed in a desert area where it is windy and little cloudy.

The sun altimeter provides the reference unit with data about a sun altitude depending on date and time corresponding to an operating time point of the system for cleaning the surface of the solar cell panel and the latitude and longitude corresponding to an operating position. The anemoscope/anemometer provides the reference unit with data about a wind direction and a wind velocity depending on an operating position of the system for cleaning the surface of the solar cell panel. The dust meter provides the reference unit with data about a dust concentration in atmosphere depending on an operating position of the system for cleaning the surface of the solar cell panel. The nephometer provides the reference unit with data about a cloud amount depending on an operating position of the system for cleaning the surface of the solar cell panel. The rainfall meter provides the reference unit with data about a rainfall depending on an operating position of the system for cleaning the surface of the solar cell panel. Since various weather conditions are applied to the sunlight measuring apparatus, the reference unit may provide a more precise reference value to the control unit.

In the cleaning of the surface of the solar cell panel by the operation of the cleaning apparatus, the driving unit may operate the cleaning apparatus according to the command of cleaning the surface of the solar cell panel provided from the control unit. According to this, the surface of the solar cell panel may be cleaned. The cleaning apparatus may use at least one mechanical power selected from reciprocation, rotation, and translation of a wiper or/and a brush. Alternatively, the cleaning apparatus may use static attraction or repulsive power.

Since the driving unit is configured to operate the cleaning apparatus capable of cleaning surfaces of the solar cell panels independently, only the surface with the foreign substances accumulated of the solar cell panels may be selectively cleaned. Accordingly, the energy loss and degradation of the cleaning apparatus due to the operation thereof may be minimized.

Also, the method of driving the system for cleaning the surface of the solar cell panel may further include comparing power generation values of the solar cell panel before/after an operation of the cleaning apparatus and commanding an additional operation of the cleaning apparatus. The additional operation of the cleaning apparatus may be performed when an increase in the power generation value does not satisfy an expected value even though the surface of the solar cell panel is cleaned by the cleaning apparatus.

In addition, the method of driving the system for cleaning the surface of the solar cell panel may further include comparing power generation values of the solar cell panel before/after the additional operation of the cleaning apparatus and transferring a warning signal to the management unit. The warning signal may be transferred when the increase of the power generation value does not satisfy an expected value even though the cleaning apparatus is additionally operated. The management unit may receive the warning signal about error of the system for cleaning the surface of the solar cell panel from the control unit. This may be because the fact that the increase of the power generation value does not satisfy the expected value is caused by other factors, not the foreign substances accumulated on the surface of the solar cell panel. In this case, the control unit may stop the additional operation of the cleaning apparatus to transfer the warning signal to the management unit.

When the power generation value measured at the particular or entire solar cell panel decreases, the control unit may analyze data such as date and time or/and weather conditions at the decreasing point of the power generation value to determine the cause of decrease in the power generation value. For example, when it is determined that the decrease in the power generation value is caused just by change in the sun altitude or the sunset or/and change in the weather condition, the control unit may not command the driving unit to operate the cleaning apparatus for removing the foreign substances on the surface of the solar cell panel. On the other hand, when it is determined that the decrease in the power generation value is caused by excessive accumulation of the foreign substances such as sand contained in the wind on the surface of the solar cell panel, the control unit may analyze previously input data and command the driving unit to operate the cleaning apparatus for removing the foreign substances accumulated on the surface of the solar cell panel with the optimized frequency and strength. Also, when the strong wind containing sand blows temporally, the cleaning efficiency for the surface of the solar cell panel decreases. Therefore, the control unit may not command the driving unit to operate the cleaning apparatus until the wind becomes weak below a predetermined level. That is, the cleaning apparatus may operate only when the power generation value decreases because of the contamination of the surface of the solar cell panel. Accordingly, the energy loss and degradation of the cleaning apparatus due to the operation thereof may be minimized.

As the cleaning apparatus of the system for cleaning the surface of the solar cell panel is effectively operated using the above-described method, the power generation efficiency of the solar cell panel can be improved. Also, the energy loss and degradation of the cleaning apparatus can be minimized.

As the surface of the solar cell panel is cleaned using the system for cleaning the surface of the solar cell panel according to the embodiments of the present invention, the power generation efficiency of the solar cell panel can be improved. Also, the cleaning apparatus for cleaning the surface of the solar cell panel can have the improved driving efficiency. Accordingly, there can be provided the system for cleaning the surface of the solar cell panel that can improve the power generation efficiency of a large-scale solar photovoltaic power generation system and minimize the energy loss and the degradation of the cleaning apparatus.

The invention claimed is:

1. A system for cleaning a surface of a solar cell panel, comprising:

a measurement unit measuring a power generation value of a solar cell panel;

a reference unit providing a reference value;

a control unit comparing the power generation value measured at the measurement unit with the reference value provided from the reference unit to command cleaning of the solar cell panel;

a driving unit operating a cleaning apparatus for cleaning a surface of the solar cell panel; and a management unit receiving a warning signal from the control unit, wherein the control unit commands the cleaning of the solar cell panel only when the power generation value decreases for a reason of a contamination of the surface of the solar cell panel, and wherein the management unit receives the warning signal from the control unit when a decrease in the power generation value is caused by other reasons than the contamination of the surface of the solar cell panel.

2. The system of claim 1, wherein the measurement unit comprises at least one selected from an ammeter, a voltmeter, a wattmeter, and a watt-hour meter for measuring the power generation value of the solar cell panel.

3. The system of claim 1, wherein the reference unit comprises a reference solar cell with a clean surface.

4. The system of claim 1, wherein the reference unit comprises a sunlight measuring apparatus where an error range of a power generation value caused by a surface cleanness is controlled within 10%.

5. The system of claim 4, wherein the reference unit further comprises at least one selected from a sun altimeter providing data about a sun altitude depending on date, time, latitude and longitude, an anemoscope/anemometer providing data about a wind direction and a wind velocity, a dust meter providing data about a dust concentration in atmosphere, a nephometer providing data about a cloud amount, and a rainfall meter providing data about a rainfall.

6. The system of claim 1, wherein the control unit compares power generation values of the solar cell panel before/after an operation of the cleaning apparatus to determine whether to command an additional operation of the cleaning apparatus or transfer the warning signal to the management unit.

7. The system of claim 1, wherein the cleaning apparatus uses at least one mechanical power selected from reciprocation, rotation, and translation of a wiper or/and a brush.

8. The system of claim 1, wherein the cleaning apparatus uses static attraction or repulsive power.

9. A system for cleaning a surface of a solar cell panel, comprising:
   a measurement unit measuring a power generation value of a solar cell panel;
   a reference unit providing a reference value, the reference unit including at least one selected from an anemoscope/anemometer providing data about a wind direction and a wind velocity, a dust meter providing data about a dust concentration in atmosphere, a nephometer providing data about a cloud amount, and a rainfall meter providing data about a rainfall;
   a control unit comparing the power generation value measured at the measurement unit with the reference value provided from the reference unit to command cleaning of the solar cell panel; and
   a driving unit operating a cleaning apparatus for cleaning a surface of the solar cell panel,
   wherein the control unit commands the cleaning of the solar cell panel only when the power generation value decreases for a reason of a contamination of the surface of the solar cell panel.

* * * * *